United States Patent
Diverdi et al.

(10) Patent No.: US 9,330,340 B1
(45) Date of Patent: May 3, 2016

(54) NOISE ESTIMATION FOR IMAGES USING POLYNOMIAL RELATIONSHIP FOR PIXEL VALUES OF IMAGE FEATURES

(71) Applicant: Google Inc., Mountain View, CA (US)

(72) Inventors: Stephen Joseph Diverdi, Oakland, CA (US); Sevket Derin Babacan, San Francisco, CA (US); Aravind Krishnaswamy, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/704,918

(22) Filed: May 5, 2015

Related U.S. Application Data

(60) Provisional application No. 61/989,429, filed on May 6, 2014.

(51) Int. Cl.
| | |
|---|---|
| *G06K 9/00* | (2006.01) |
| *G06K 9/62* | (2006.01) |
| *G06T 11/00* | (2006.01) |
| *G06T 5/00* | (2006.01) |

(52) U.S. Cl.
CPC .............. *G06K 9/6202* (2013.01); *G06T 5/002* (2013.01); *G06T 11/001* (2013.01)

(58) Field of Classification Search
CPC ...... G06K 9/40; G06K 9/6202; G06T 11/001; G06T 5/002; G06T 2207/10024; G06T 7/408
See application file for complete search history.

(56) References Cited

U.S. PATENT DOCUMENTS

| | | | |
|---|---|---|---|
| 5,825,846 A | 10/1998 | Aach et al. | |
| 5,923,775 A | 7/1999 | Snyder et al. | |
| 6,636,645 B1 | 10/2003 | Yu et al. | |
| 6,950,211 B2 * | 9/2005 | Trifonov | G06T 5/002 359/3.26 |
| 6,970,605 B1 | 11/2005 | Kondo et al. | |
| 7,133,070 B2 * | 11/2006 | Wheeler | H04N 1/40 348/223.1 |
| 7,292,735 B2 * | 11/2007 | Blake | G06K 9/03 348/E13.064 |
| 7,983,501 B2 | 7/2011 | Chiu | |
| 8,599,288 B2 | 12/2013 | Oishi | |
| 8,665,376 B2 | 3/2014 | Mathew et al. | |
| 8,768,093 B2 | 7/2014 | Yoo et al. | |
| 8,885,941 B2 * | 11/2014 | Schiller | G06T 5/003 382/180 |
| 8,953,877 B2 | 2/2015 | Babacan | |
| 2006/0039590 A1 | 2/2006 | Lachine et al. | |

(Continued)

OTHER PUBLICATIONS

Mitchell, Glenn E. "Nik Dfine 2.0 Software Review." The Light's Right; http://www.thelightsright.com. 2008.

(Continued)

*Primary Examiner* — Phuoc Tran
(74) *Attorney, Agent, or Firm* — IP Spring

(57) ABSTRACT

Implementations relate to estimating noise in images using a polynomial relationship for pixel values of image features. In some implementations, a computer-implemented method to estimate noise in an image includes determining a plurality of patches of pixels in the image. For each patch of pixels, the method determines feature pixels in the patch that are included in a particular image feature at least partially depicted in the patch. The method determines an error estimate for each patch of pixels, where each error estimate is based on an amount by which pixel values of the feature pixels in the patch of pixels are different from an estimated polynomial relationship between the feature pixels in the patch of pixels. One of the error estimates is selected as a noise level estimate for the image.

20 Claims, 5 Drawing Sheets

(56) References Cited

U.S. PATENT DOCUMENTS

2007/0109430 A1 5/2007 Staelin et al.
2008/0239153 A1 10/2008 Chiu

OTHER PUBLICATIONS

Freeman, William T. et al.; "Noise Estimation from a Single Image;" IEEE Conference on Computer Vision and Pattern Recognition (CVPR); New York, NY; Jun. 2006; pp. 1-8.

Bosco, Angelo et al.; "Adaptive Temporal Filtering for CFA Video Sequences;" Proceedings of ACIVS: Advanced Concepts for Intelligent Visionsystems; Sep. 9, 2002; pp. S00-1-S00-6.

European Patent Office; International Search Report for PCT/US2014/037855; Aug. 29, 2014; 5 pages.

U.S. Appl. No. 13/894,364, filed May 14, 2013; USPTO prosecution history—Notice of Allowance and Issue Notification; 17 pages.

* cited by examiner

NOISE ESTIMATION FOR IMAGES USING POLYNOMIAL RELATIONSHIP FOR PIXEL VALUES OF IMAGE FEATURES

CROSS REFERENCE TO RELATED APPLICATIONS

The present application claims priority to U.S. Provisional Application No. 61/989,429, filed May 6, 2014, which is incorporated herein by reference in its entirety.

BACKGROUND

The popularity and convenience of digital cameras as well as the widespread of use of Internet communications have caused user-produced images such as photographs to become ubiquitous. For example, users of Internet platforms and services such as email, bulletin boards, forums, and social networking services post images for themselves and others to see. Many images, such as photographs taken by a camera, include various forms of image noise that detract from the quality of the image. Such noise includes undesired variation in color or brightness of the pixels of an image, and can be produced from a variety of sources including lighting conditions under which an image was captured, performance of camera or other hardware components (e.g., CCD sensor noise), image compression techniques, and other sources.

SUMMARY

Implementations of the present application relate to estimating noise in images using a polynomial relationship for pixel values of image features. In some implementations, a computer-implemented method to estimate noise in an image includes determining a plurality of patches of pixels in the image. For each patch of pixels, the method determines feature pixels in the patch that are included in a particular image feature at least partially depicted in the patch. The method determines an error estimate for each patch of pixels, where each error estimate is based on an amount by which pixel values of the feature pixels in the patch of pixels are different from an estimated polynomial relationship between the feature pixels in the patch of pixels. One of the error estimates is selected as a noise level estimate for the image.

Various implementations and examples are described. For example, the pixel values of the feature pixels can be color values of the feature pixels. The estimated polynomial relationship in the pixel values can be an estimated linear relationship in a change of the pixel values across adjacent pixels in the patch. Determining the plurality of patches can include dividing the image into rectangular patches in a grid pattern, and the particular image feature can include an object or a region depicted in the image.

Determining feature pixels in the patch can include determining the feature pixels with reference to a reference pixel in the patch, where the reference pixel can be included in the particular image feature. In some implementations, determining the feature pixels in the patch can include assigning weights providing a greater contribution to the error estimate of the patch to pixels in the patch that are included in the particular image feature, and assigning weights providing a lesser contribution to the error estimate to pixels in the patch that that are not included in the particular image feature, where each error estimate can be an estimate of an amount by which the weighted pixel values of the pixels in the patch of pixels are different from the estimated polynomial relationship. In some implementations, determining the feature pixels can include applying an edge-respecting filter to identify the feature pixels as pixels within boundaries of the particular image feature depicted in the patch. Determining the feature pixels can include determining, for each pixel in the patch, a similarity between the pixel and a reference pixel in the patch based on a comparison of the pixel to the reference pixel, where the feature pixels in the patch have greater similarity to the reference pixel than pixels in the patch that are not feature pixels. For example, the similarity between the pixel and the reference pixel can include a color similarity, and/or the similarity can be based on a distance between the pixel and the reference pixel, e.g., where a greater distance between the pixel and the reference pixel indicates a lower similarity.

Determining the error estimate for each patch of pixels can include fitting an estimated plane to a plurality of the feature pixels based on pixel positions of the plurality of feature pixels in the patch, where the estimated plane can indicate fitted pixel values at corresponding pixel positions, and determining differences in pixel values of one or more pixels of the patch and the fitted pixel values on the estimated plane at pixel positions corresponding to the one or more pixels. For example, each pixel can have a color value in each of multiple color channels, and an estimated color channel plane can be fitted to each color channel of the plurality of the feature pixels. Determining an error estimate can include applying orthogonal vector projection to each patch to de-correlate a common directional component in the color channels of the differences in pixel values of the patch.

Selecting one of the error estimates can include determining, for each patch, a luminance of the patch and, prior to selecting one of the error estimates, discarding one or more error estimates corresponding to one or more patches of pixels having a determined luminance within a predetermined range. Selecting one of the error estimates can include assigning each patch of pixels to one of a plurality of tonal regions based on the luminance of the patch of pixels, identifying a tonal region noise estimate for each of the tonal regions as an approximately minimum error estimate (e.g., close to minimum error estimate, such as first percentile) from the error estimates of the patches assigned to the tonal region, and selecting a minimum of the tonal region noise estimates as the noise estimation for the image. For example, the pixel values in one or more of the tonal regions can be weighted based on the luminance values in the tonal region. The tonal regions can include a shadow region, a mid-tone region, and/or a highlight region. Selecting one of the error estimates can include determining that one or more of the error estimates satisfies an error threshold, and, prior to selecting one of the error estimates, discarding the one or more error estimates satisfying the error threshold.

In some implementations, a system to estimate noise in an image can include a storage device and at least one processor operative to access the storage device and operative to perform operations. The operations include determining a plurality of patches of pixels in the image and, for each patch of pixels, weighting a pixel value of each pixel in the patch based on a similarity of the pixel to a reference pixel in the patch. The operations include determining an error estimate for each patch of pixels, where each error estimate is an estimate of an amount by which the weighted pixel values of the pixels in the patch of pixels are different from an estimated polynomial relationship between the weighted pixels in the patch of pixels. The operations include selecting one of the error estimates as a noise level estimate for the image. Various implementations and examples of the system are also described. For example, the pixel values of the patch can be color values of the feature pixels and the polynomial relationship can be a linear relationship of the weighted pixel values. Weighting a pixel value of each pixel in the patch can be based on a similarity of the pixel value to the reference pixel in the patch, where weights providing greater contribution to the error estimates are assigned to pixels in the patch that are more similar to the reference pixel.

In some implementations, a computer readable medium has stored thereon software instructions that, when executed by a processor, cause the processor to estimate noise in an image by performing operations. The operations include determining a plurality of patches of pixels in the image, and, for each patch of pixels, determining feature pixels in the patch that are included in a particular image feature at least partially depicted in the patch. The operations include determining an error estimate for each patch of pixels, where each error estimate is based on an amount by which color values of the feature pixels in the patch of pixels are different from an estimated linear relationship between the feature pixels in the patch of pixels. The operations include selecting one of the error estimates as a noise level estimate for the image.

DETAILED DESCRIPTION

Figure 1:
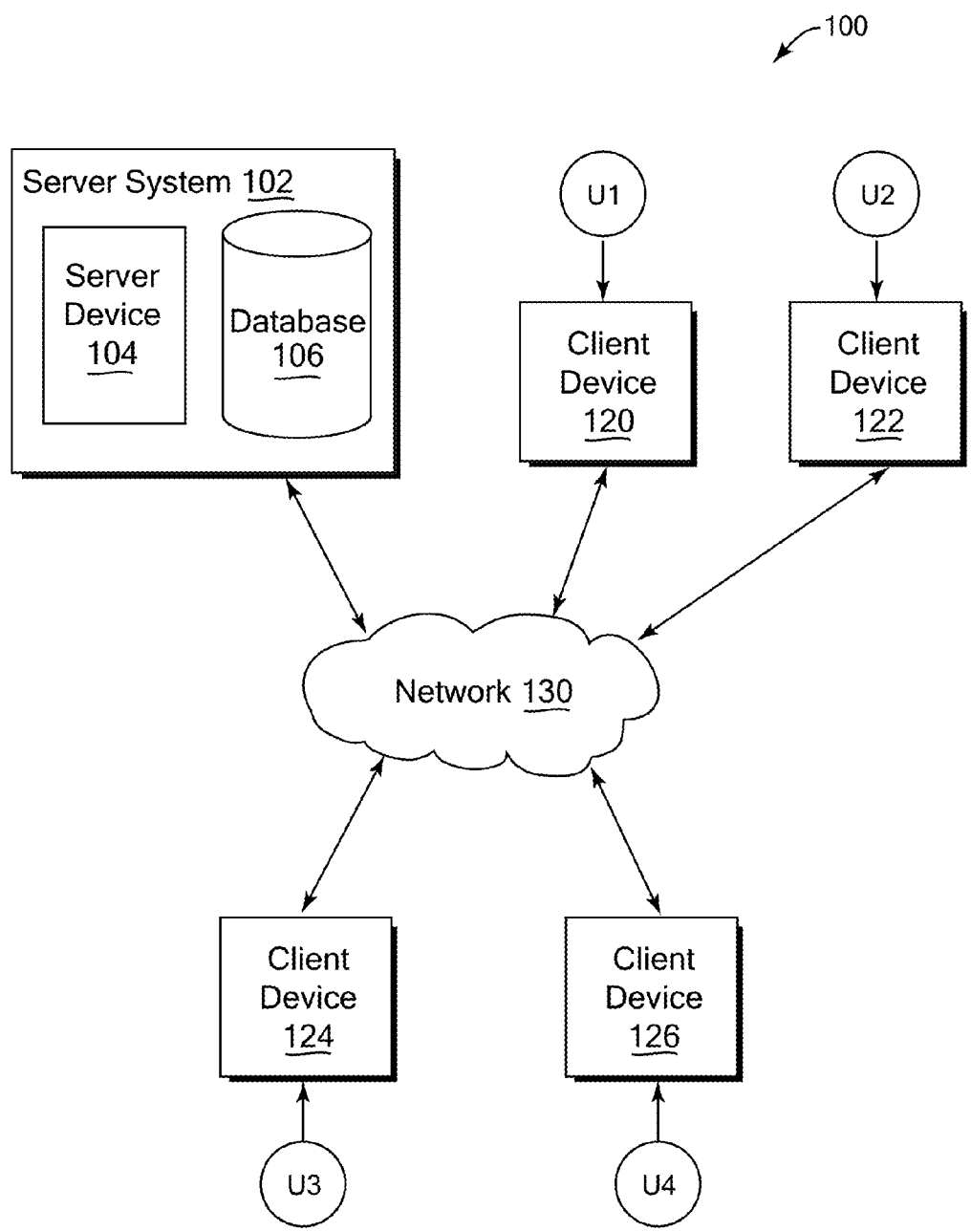
FIG. 1 is a block diagram of an example network environment which may be used for one or more implementations described herein.

One or more implementations described herein relate to estimating noise in images using a polynomial assumption for pixel values of image features. In some implementations, patches of pixels in an image are determined. Further, feature pixels are determined in each of the patches that are part of an image feature at least partially depicted in the image, such as an object or region depicted in the image. An error estimate is determined for each of the patches of pixels. For example, each error estimate can be an estimate of an amount by which the pixel values, e.g., color values, of the feature pixels are different from (e.g., do not satisfy) an estimated polynomial relationship (e.g., a linear relationship) of the pixel values. One of the error estimates for one of the patches is selected as a noise level estimate for the image. In some implementations, for example, an approximately minimum error estimate can be selected. In some implementations, one or more patches may be discarded based on predetermined criteria, prior to selecting the minimum error estimate.

Various implementations can be used. For example, the feature pixels can be determined in each patch with reference to a reference pixel in the patch, where the reference pixel is included in the particular image feature. In some examples, a center pixel of each patch can be a reference pixel. Some implementations can determine similarity and/or assign weights to pixels based on the similarity of the pixels to the reference pixel. In these implementations, each error estimate can be an estimate of an amount that feature pixels (e.g., weighted pixel values) are different from the estimated polynomial relationship in the pixel values. For example, weights that contribute more to the error estimation can be assigned to pixels in the patch that are similar to the color of and/or are closer in distance to the reference pixel. Some implementations can include processing the pixels of each patch with an edge-respecting filter. In these implementations, the edge-respecting filter may allow determination of the feature pixels within boundaries of the particular image feature depicted in each patch. Some implementations can determine the error estimate by fitting an estimated plane to feature pixels (or weighted pixels), where the estimated plane indicates color values at corresponding pixel positions. These implementations, for example, can determine error estimates as differences in color values between pixels of the patch and corresponding color values on the estimated plane at those pixel positions. Further, some implementations can assign each patch of pixels to a tonal region (e.g., shadows, mid-tones, and highlights) based on luminance of the pixels, weight the pixel values based on the tonal region, and select the approximate minimum out of each tonal region's noise estimates to find the overall noise estimation for the image.

Described features can allow effective automated detection and estimation of noise. For example, significant image noise may occur in low-light conditions in which an image is captured, and if the exposure (gain) of the image is increased, the noise can be amplified to cause the image to have a low-quality, grainy appearance. In some examples, quantifying the amount of noise in an image may be important to use as a threshold for different image editing techniques. For example, some techniques can increase detail in an image by sharpening the detail, e.g., sharpening edges such as discontinuities in color between adjacent or nearby pixels. If the image has low noise, the details can be part of depicted image content and enhancing the details can cause the image content appear more crisp. However, if the image has significant noise, then sharpening or otherwise enhancing the detail may emphasize the noise and cause the image look worse to a viewer, e.g., obscure detail or otherwise reduce clarity, introduce inaccurate colors, etc. Therefore, measuring the amount of noise in the image can be useful in automatic application of image enhancement filters.

One or more features described herein can allow the level of noise in an image to be efficiently and reliably characterized. Further, the features may reduce inaccuracies and over-detection of noise. For example, described features allow noise estimation based on examination of pixels that are part of a particular depicted image feature (e.g., depicted object, region, or portion thereof) and omission or reduction in weight of pixels that are part of other image features. This allows a system to examine similar pixels for noise and avoid or reduce examination of pixels that have different colors or other characteristics. The system can reduce overestimation of noise caused by such different pixels and obtain an accurate estimation of noise for an image. Furthermore, described features can evaluate pixel colors using a polynomial assumption of pixel values such as colors in the image when detecting deviations in color of pixels for estimating noise. This allows accounting for linear changes in color (or other polynomial relationship of changes), such as color gradients, without evaluating such changes as noise. Such changes can be common in images. In contrast, a constant color assumption would not take into account these changes and may evaluate them as noise. Thus described techniques can reduce overestimation of noise and increase the accuracy of a noise estimation for the image. The described noise estimations are automatically, efficiently, and effectively performed, allowing a user to avoid tedious manual examination and noise reduction of images. Consequently, a technical effect of one or more described implementations is that examination and editing of image data is reduced in time and resources expended to obtain accurate display results.

Herein, an image feature can refer to any type of feature having similar appearance (e.g., similar colors) throughout its displayed area in an image. An image feature can include an object depicted in the image, an element or characteristic of a depicted object (e.g., a portion, surface, component, or side of an object colored, shaped, or textured differently than other portions), a region of an image (e.g., sky region, water region, etc.), a background area behind one or more depicted objects, a landscape feature, etc. Texture can refer to textural features within an image and patch, such as patterns that provide an appearance of a particular type of surface in a photograph (e.g., rough, corrugated, streaked, dappled, etc.). Texture content can include pixels having larger, rapid color changes or color discontinuities in order to provide the desired texture appearance, thus providing edges of higher color contrast.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other and/or server system 102 via network 130. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a desktop computer system, laptop computer, portable device or mobile device, cell phone, smart phone, tablet computer, wearable device (e.g., goggles or glasses, wristwatch, headset, device included in headband, hat, armband, jewelry, belt, etc.), television, TV set top box or entertainment device, personal digital assistant (PDA), media player, game device, appliance device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service implemented on server system 102. For example, respective client devices 120, 122, 124, and 126 may transmit communications and data to one or more server systems such as system 102. In some implementations, the server system 102 may provide appropriate data to the client devices such that each client device can receive communicated content or shared content uploaded to the server system 102 and/or network service. A network service implemented by server system 102 can include a system allowing users to perform a variety of communications, form links and associations, upload and post shared content such as images, text, video, audio, and other types of content, and/or perform socially-related functions. In some implementations, a "user" can include one or more programs or virtual entities, as well as persons that interface with the system or network.

A user interface can enable display of images, video, data, and other content as well as communications, privacy settings, notifications, and other data on a client device 120, 122, 124, and 126. Such an interface can be displayed using software on the client device and/or a combination of client software and server software executing on the server system 102, e.g., application software or client software in communication with the server system. The user interface can be displayed on an output device of a client device or server device, such as a display screen.

In some implementations, server system 102 and/or one or more client devices 120-126 can provide an image editing and/or display application, e.g., included in a communication application, provided as a video display application, or other application. The image editing application may allow a user to edit various characteristics of images. The image editing application can provide an associated image editing user interface that is displayed on a display of the server system or client device. The image editing user interface may provide various editing tools. The image editing user interface may provide, for example, image editing tools and noise detection tools which can use one or more features described herein.

Other implementations can use any type of system and service. For example, any type of electronic device can make use of features described herein. Some implementations can provide features described herein on client or server systems disconnected from or intermittently connected to computer networks. In some examples, a client device having a display screen (or other display device) can display images and provide features and results as described herein that are viewable to a user.

Figure 2:
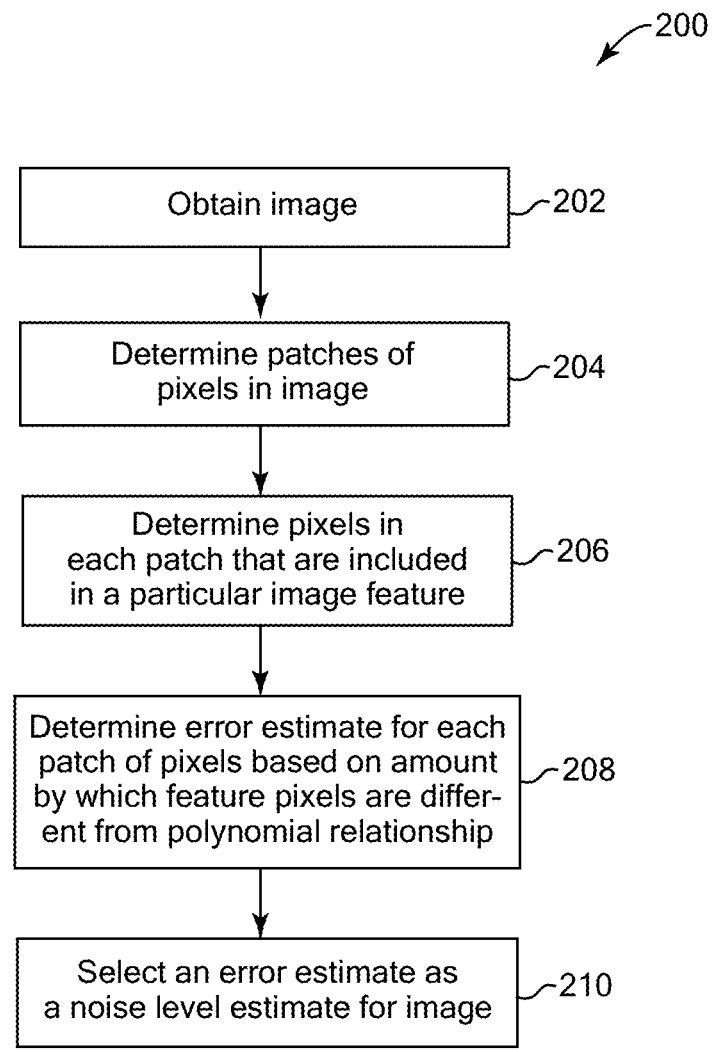
FIG. 2 is a flow diagram illustrating an example method to estimate noise in images using a polynomial relationship for pixel values of image features, according to some implementations.

FIG. 2 is a flow diagram illustrating one example of a method 200 to estimate noise in images using a polynomial relationship for pixel values of image features. In some implementations, method 200 can be implemented, for example, on a system such as a server device, e.g., a server system 102 as shown in FIG. 1. In some implementations, some or all of the method 200 can be implemented on a system such as one or more client devices 120, 122, 124, or 126 as shown in FIG. 1, and/or on both a server device and a client device. In described examples, the implementing system includes one or more processors or processing circuitry, and one or more storage devices such as a database 106 or other storage. In some implementations, different components of one or more servers and/or clients can perform different blocks or other parts of the method 200.

In some implementations, the method 200 (or method 300 below) can be initiated automatically by a system. For example, the method (or portions thereof) can be periodically performed, or performed based on one or more particular events such as one or more images being newly uploaded to or accessible by the system, or one or more conditions specified in custom preferences of one or more users of the system. In one example, a camera, cell phone, tablet computer, wearable device, or other client device can capture an image and can perform the method 200. In addition or alternatively, the client device can send a captured image to a server over a network, and the server can process the image using method 200. In another example, the system can obtain the image from accessible storage in the system, e.g., local storage or storage accessed over one or more networks. Some implementations can initiate method 200 based on user input. A user may, for example, have selected the initiation of the method 200 from an interface such as an application interface, network service interface, or other interface.

Method 200 allows detection of noise in images. For example, color noise can be detected. Color noise (e.g., chromatic noise) is unintended or undesired color variation or changes in pixels of an image and can be caused by, for example, lighting conditions under which images are captured by a camera (e.g., underexposed photographs), performance of camera components (e.g., image sensors, etc.), image processing software or image conversions, and/or various other causes. Color noise generally causes small variations in color values of pixels. Such noise can be detected and its magnitude estimated in the image method 200. Noise can be distinguished from color edges of image features depicted in the image, such as depicted objects and regions. For example, noise can be distinguished from high-contrast color variations caused by textures of image features such as objects, regions, and backgrounds.

Noise can be detected in an examined sample patch of pixels having an approximately uniform color content. However, images commonly have non-uniform color content, such as low-frequency color gradients (e.g., small, gradual changes in color brightness and/or hue) caused by illumination on subject matter captured in the image. If a noise detection method assumes that uniform color is present in patches of pixels (e.g., using a constant assumption), sample patches may erroneously appear as if they include a high amount of noise since the color gradients will appear as noise. Using a polynomial (e.g., linear) assumption for noise detection, such as a piecewise polynomial assumption as described for method 200, allows such gradient content and other polynomial-based color changes to be discounted and excluded as noise, allowing more accurate estimation of actual noise in the image.

In operation 202 of method 200, the method obtains an image for processing. The image can be a digital image composed of multiple pixels, for example, and can be stored on one or more storage devices of the system or otherwise accessible to the system, such as a connected storage device, e.g., a local storage device or storage device connected over a network. In various implementations, the image can be automatically selected by the method, e.g., as an image from an album or other collection of multiple images of a user, a database or other storage device, etc. The image can be stored on one or more storage devices of a system or otherwise accessible to the method, e.g., a connected storage device, a local storage device, a storage device connected over a network, etc. For example, an album can be locally stored and accessible by the device performing method 200, and/or can be remotely stored on a server or client device, such as an album provided in an account of a user of a network service. In some implementations, the system can determine which image to obtain based on evaluating one or more characteristics of accessible images, such as the color distributions of images, timestamps and other metadata of images, and/or identified and recognized content depicted in the images, such as persons, faces, or objects. Alternatively, a user can provide or designate one or more images to process.

In operation 204, the method determines patches of pixels in the image. The patches of pixels are different portions of the image which are separately processed to estimate the noise in those portions, and from which an overall noise can be estimated for the entire image. The patches can be determined by the method in any of a variety of ways, some examples of which are described below with reference to FIG. 3. In some examples, each patch can be a rectangular block or other-shaped block including multiple pixels of the image. Some implementations can determine the patches over the entire area of the image. Some implementations can determine the patches in one or more portions of the image that collectively cover less than the entire image area. In some examples, the method can determine one or more particular areas of the image in which to estimate noise and determine the patches of pixels based on one or more image characteristics (e.g., pixel color, brightness, contrast, or other visual characteristics, image size and/or resolution, image metadata (time/date, e.g., of image capture or edit, location of image capture, make of camera capturing the image, user-related data, etc.), detected edges, image features such as faces, objects, landscapes, or other features recognized using facial recognition or other image recognition techniques, etc.).

In operation 206, the method determines, in each patch of the image, pixels that are included in (e.g., part of) a particular image feature at least partially depicted in the patch. In some implementations, such pixels can be considered "feature pixels" herein, and can be used in the noise estimation as described below. For example, the determined pixels can be positioned in each patch with reference to a reference pixel in the patch, also referred to as a sample point pixel herein. In some examples, a reference pixel can be a center pixel of the patch and is included in an image feature such as a depicted object, a portion of an object, or region (e.g., a contiguous region of similar color, brightness, or other pixel value or characteristics). Some implementations can use a different pixel than the center pixel in each patch as a reference pixel (e.g., a pixel that is off center, near a corner or border of a patch, etc.). The pixels of the patch can be compared to the reference pixel to determine whether they are included in the same image feature as the reference pixel. For example, a similarity measure can be used to determine the similarity between the pixels of the patch and the reference pixel. In some implementations, pixels can be determined as feature pixels if they are determined to be included in the same image feature in which the reference pixel is included.

One or more pixel characteristics can be compared for similarity between the pixels and the reference pixel. In some examples, the color value of the reference pixel can be compared for similarity to the color values of the other pixels of the patch, where a similarity in color can indicate greater likelihood of being part of the same image feature. For example, a color similarity threshold can be used in some implementations, where a color similarity greater than the threshold similarity indicates a feature pixel. Some implementations can compare for pixel position similarity, e.g., determine the distance between the reference pixel and the other pixels of the patch, where a closer distance can indicate greater likelihood of being part of the same image feature. For example, a distance threshold can be used in some implementations, where a distance less than the distance threshold indicates a feature pixel. Other pixel characteristics can be also or alternatively compared (e.g., brightness, contrast, etc.). In some implementations, non-feature pixels can have greater differences in color values, greater distances to the reference pixel, etc. In some implementations, operation 206 can determine feature pixels based on edges detected in the patch of pixels, where the edges can be borders to an image feature. For example, a pixel on the same side of an edge (e.g., and no edges are positioned between the pixel and the reference pixel) can be more likely to be included in the same image feature as the reference pixel. A pixel located on a different side of an edge than the reference pixel may be more likely to be included in different image features than the reference pixel. Some implementations can provide an individual score for each such pixel characteristic that is compared to the reference pixel. For example, a total score can be a combination (e.g., sum) of the individual scores, and the total score can be compared to a feature pixel threshold to determine if a pixel is a feature pixel. Some implementations can remove (e.g., discard) pixels from consideration in the noise estimation that have a total score that does not satisfy the feature pixel threshold. Other implementations may assign such pixels less influence (e.g., contribution) in the noise estimation (e.g., if using weighting in some implementations as described below).

In some implementations, the determination of feature pixels in operation 206 can be performed by weighting the pixels and their pixel values in the patch. For example, weights can be assigned to the pixels, where a weight of a pixel can be valued based on the likelihood that the pixel is included in the same image feature as the reference pixel (e.g., a greater weight for a greater such likelihood). The likelihood can be based on the similarity of the pixels to the reference pixel as described above, for example. In some implementations, pixels having a weight that satisfies a feature pixel weight threshold (e.g., above the threshold) can be considered feature pixels and used in the noise estimation. Some implementations can remove from consideration non-feature pixels having a weight that does not satisfy the feature pixel weight threshold (e.g., below the threshold). Some implementations can use all the pixels of the patch in the noise estimation, where each pixel provides a contribution to the estimation of noise based on its weight (e.g., where some contributions can be zero or close to zero). Some examples of weighting pixels are described below in greater detail with respect to FIG. 3.

In operation 208, the method determines an error estimate for each patch of pixels based on an amount by which pixel values of the feature pixels in the patch of pixels are different from (e.g., do not satisfy) an estimated polynomial relationship between the feature pixels in the patch. For example, the method can determine an estimate of an amount that the pixel (e.g., color) values of the feature pixels in a patch of pixels do not satisfy a polynomial (e.g., linear) relationship in the change of the pixel values over successive pixel positions of the image. Some implementations can use a piecewise linear assumption of color values for the image, e.g., an assumption of a linear relationship in pixel values for a portion or "piece" of the image in each patch. In some examples, the piece is the portion of the patch having the feature pixels determined in operation 206 depicting an image feature or portion of image feature. For example, a piecewise linear assumption can assume that each feature pixel piece can be approximately described by a single linear relationship between its pixel values, e.g., that there can be linear changes to color values across the pixels of the piece, such as gradients of color, that are not noise. This can allow the noise estimate for each patch to be more accurate. Some examples of using a piecewise linear assumption for error estimation can fit an estimated plane to feature pixels based on pixel positions of the feature pixels in the patch. In such examples, the estimated plane can indicate color values at corresponding pixel positions, and the noise estimation can be based on differences in color values of patch pixels and the color values on the estimated plane at pixel positions corresponding to the patch pixels. Some examples of using a piecewise linear assumption for error estimation are described below with reference to FIG. 3. Some implementations can use a different polynomial-based assumption other than a linear assumption, e.g., an assumption based on a curve (e.g., quadratic function), sine or cosine function, etc.

In contrast, a constant assumption used for noise detection may assume that an entire patch or examined portion is constant in color. However, such constancy may not be common in images. For example, some photos may have extremely high details in regions of the photo and/or have color gradients, and may have few or no smooth mono-colored regions. A constant assumption may detect noise when in fact no noise exists and therefore over-estimate the noise. A linear assumption may more accurately detect whether noise is present in a particular patch and in an image. Furthermore, a piecewise assumption uses (or favors) pixels that are part of the same image feature to estimate noise. This can be more accurate than using all of the pixels in an entire patch (e.g., all pixels providing the same contribution) to estimate noise, where pixels included in different image features can cause overestimation of noise since color edges, textures, and other non-noise portions of different image features (or boundaries between image features) can be detected as noise.

In operation 210, the method selects one of the error estimates for one of the patches determined in operation 208 as an overall noise level estimate for the image. In various implementations, the method can discard one or more error estimates of the patches based on predetermined criteria, which can, for example, remove outliers, underexposed or overexposed pixels, and/or pixels previously manipulated in color. Some implementations, for example, can assign patches of pixels to different tonal regions based on a luminance of the patches. In some implementations, a tonal region noise estimate for each tonal region may be selected as an approximate minimum of the error estimates of the patches of pixels in each of the tonal regions. In some implementations, a minimum of the tonal region noise estimates may be selected as the noise estimation for the image. Some examples of operation 210 are described below in greater detail with reference to operations 320-324 of FIG. 3.

Figure 3:
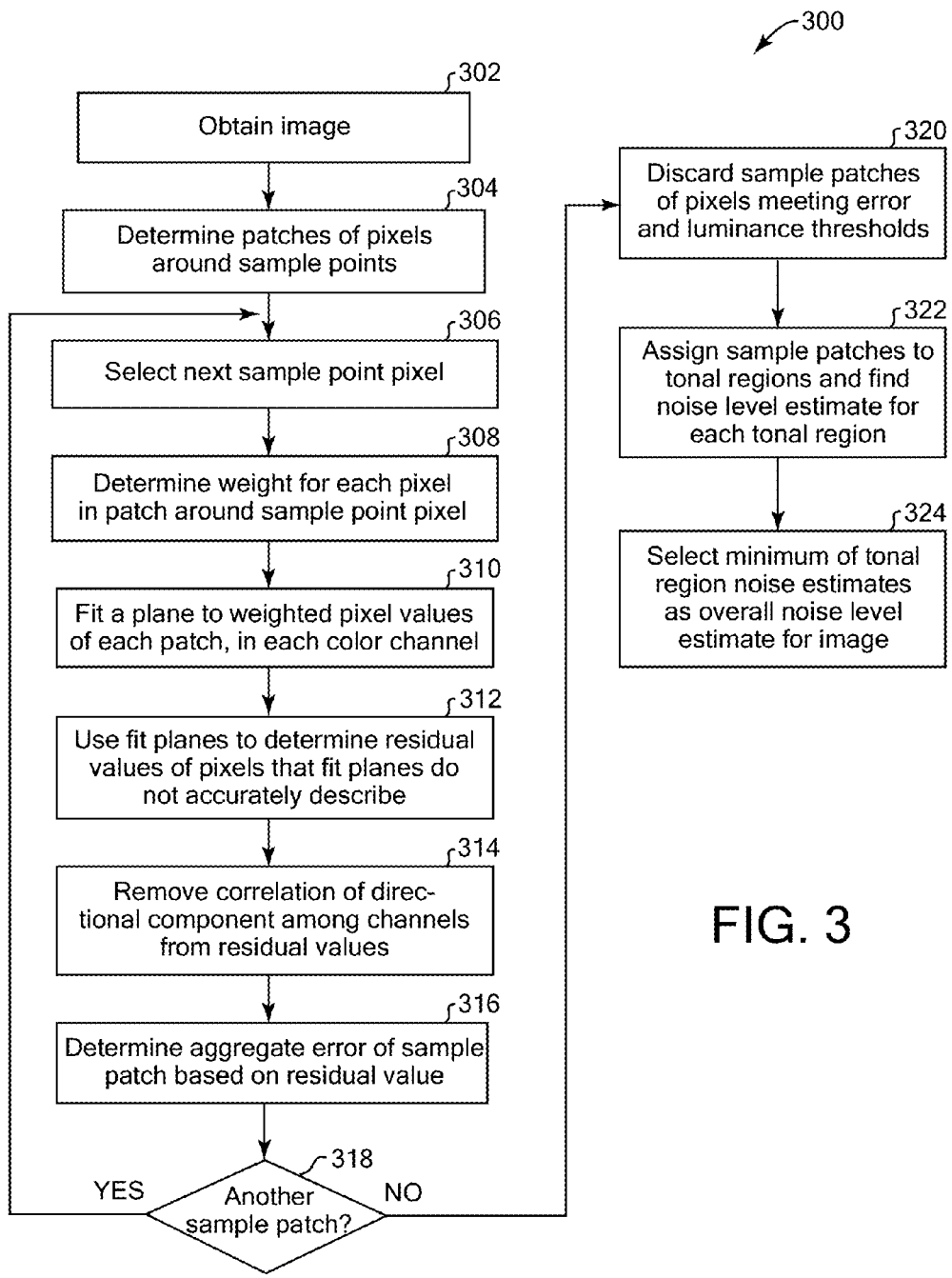
FIG. 3 is a flow diagram illustrating another example method to estimate noise in images using a polynomial relationship for pixel values of image features, according to some implementations.

FIG. 3 is a flow diagram illustrating another example method 300 to estimate noise in images using a polynomial relationship for image features. Method 300 can be implemented by a system such as a server and/or client device as described above for method 200 and initiated similarly as described for method 200.

In operation 302, the method obtains an image, e.g., similarly as described above for operation 202 of FIG. 2. In operation 304, the method determines sample points and patches of pixels around the sample points in the image. For example, in some implementations, the method can determine a sample point as the center pixel of each rectangle or square in a rectangular grid overlaid on the image, where each rectangle in the grid is a patch of pixels. In some examples used in this description, the set of sample points S can be equal to $\{s_i\}$ in the image I, where s is the sample point pixel and i ranges from 1 to the number of sample points. A "sample" or "sample patch" can also refer to the patch of pixels around (and including) a sample point pixel. The size of the grid can vary according to different implementations. For example, if a certain number of samples are desired, the grid can be spaced to produce the desired number of samples. For example, every Nth pixel (in horizontal and vertical directions) can be a sample point pixel to provide a large but computationally reasonable number of samples (e.g., 1000). For example, in some implementations, a patch size of 10 pixels, 11 pixels, 30 pixels, or other amount of pixels across a side of the patch can be used. In some examples, every pixel of the image can be a sample point pixel. In such examples, a high amount of processing may be necessary due to a large number of pixels, especially for higher-resolution images. Various implementations can determine samples that are all the same size, or some of the samples having a different size than each other. Some implementations can use other types of grids or other regular or irregular divisions of patches in the image based on any of a variety of criteria (e.g., edges or other features in the image (e.g., recognized objects or faces), characteristics of pixels, etc.).

In operation 306, the method selects the next sample point pixel in the image, which is associated with a selected patch of pixels around the sample point. Thus, selection of the next sample point pixel in operation 306 is also selection of the next patch of pixels. For example, rectangular patch P of pixels is equal to $\{p_j\}$, the set of pixels around the sample point pixel s. In the first iteration of operation 306, the selected sample point pixel is a first selected sample point pixel of the image. The sample point pixel is also referred to as a reference pixel herein.

In operation 308, the method determines a weight for each pixel in the patch around the selected sample point pixel. For example, for each pixel p in the patch P around the sample point pixel s, a bilateral weight can be determined. In this example, each pixel p can be expressed as a number of characteristic elements, e.g., as a 5-tuple such as $p=\{r, g, b, x, y\}$, where r, g, and b are color values for red, green and blue (RGB) color channels of the pixel, and x and y are coordinates of the pixel in the image. Other color spaces besides RGB can be used in other implementations, such as YCbCr, HSV, HSL, YUV, CMYK, etc., with appropriate values.

The bilateral weight can be determined based on the similarity of the pixel p to a reference pixel, which is the sample point pixel s in this example. For example, a determined similarity measure can be based on the color value similarity between the pixel and sample point pixel, as well as a pixel distance of the pixel from the sample point pixel s. For example, the longer the distance between pixels, the less similar are the pixels (e.g., the lower the similarity measure). In one example, equation (1) can be used to determine the bilateral weight of a pixel:

$$w_j = G_1(\lambda p_{rgb} - s_{rgb}\|) G_2(\|p_{xy} - s_{xy}\|) \quad (1)$$

where w is the weight and $G_1$ and $G_2$ are standard Gaussian functions with standard deviations tuned for the RGB color difference ($p_{rgb} - s_{rgb}$) and spatial pixel difference ($p_{xy} - s_{xy}$) between the pixel p and the sample point pixel s. In some examples, the Gaussian functions can be tuned by empirically evaluating results in images and tuning the functions to achieve the desired performance.

In some implementations, the weights can be determined in operation 308 so that the patch pixels that have the highest weights (e.g., weights that provide a greater contribution to the error estimate for that patch) are those pixels in the patch that are part of the same image feature (such as a depicted object, a portion of an object, or a depicted region) as the sample point pixel s for that patch. The patch pixels that have the lowest weights (e.g., weights that provide less contribution to the error estimate for that patch) can be pixels that are not part of the image feature including the sample point pixel. For example, in some implementations, one or more feature pixel weight thresholds can be used for the weight w so that, for example, pixels having weights not satisfying the threshold (e.g., weights below the threshold) are removed from consideration in the remainder of method 300. In some implementations, such weighting allows mostly (or only) pixels that are similar in color and relatively close in distance to the sample point pixel to be examined for noise, thus avoiding or reducing false detection of noise from pixels that are part of different depicted objects, edges, textures, or other image features.

In some implementations, the above weighting technique (or similar technique) can be considered to be an "edge-respecting filter," e.g., a technique that finds pixels within the same image feature and bounded by color edges in the image. An edge-respecting filter can determine edges in the image and thus can determine boundaries of a particular image feature (e.g., object or region) in which the sample point pixel is included, where the boundaries correspond to determined edges. An "edge" as referred to herein can be a discontinuity or larger change in color value (or other pixel value) from one pixel to one or more adjacent pixels in an image, as opposed to a smoother, smaller change in color values in adjacent pixels (e.g., as in a gradient). In some implementations, patch pixels on a different or opposite side of a color edge than the sample point pixel can still be considered a feature pixel for the sample point pixel if such pixels are within the spatial Gaussian function and are similar enough in color to the sample point pixel. In some implementations, other edge-respecting filters can be used to find pixels in the patch that have similar colors to the sample point pixel so that only or mostly pixels from the same image feature in the image are evaluated for noise. Some implementations can detect multiple image features in the patch of pixels, each such different feature having its own feature pixels, e.g., having similar colors and close distance to the sample point pixel of that feature, where each different feature can be examined and evaluated for noise according to method 300. For example, one or more different sample point pixels can be selected within each image feature of the patch and each feature can be independently examined for noise.

In operation 310, the method fits a plane to the feature pixels (e.g., weighted pixel values) of each patch. For example, a plane can be fitted to the pixels in each color channel of the pixels (e.g., the plane in each color channel can be considered a "color channel plane"). In some implementations, a plane is fit to the pixels determined to be part of the same image feature as described above. For example, each fitted plane can be an estimated "best fit" plane given the weighted pixel values as data points for that color channel of R, G, and B in an RGB color space example. In one example, the method can find a fitted plane $f_c$ for $c \in \{r, g, b\}$ such that $f_c(p) = p_c$, where $f_c$ is of the form $f_c(p) = Ap_x + Bp_y + C$. Thus, the fitted plane colors can be based on the pixel positions in the patch, e.g., the x and y coordinates of pixels. In some examples the method can find the solution to the values A, B, and C in the least squares sense using Singular Value Decomposition (SVD), where the influence of any pixel is weighted by $w_j$. The result is a fitted plane for each color channel, e.g., $f_r$, $f_g$, and $f_b$. In some implementations, he solution to the values A, B, and C can be found using other techniques, e.g., gradient descent and/or other optimization strategies, the QR algorithm and/or other algorithms for eigenvalue finding, etc.

In some examples, x and y coordinates of a particular pixel can be found in the x and y coordinate axes of the fitted plane, and a particular color value can be determined on the fitted plane at those pixel coordinates, e.g., the corresponding color can be considered the fitted plane color of that pixel. In some examples, color (e.g., in a particular color channel) can be the Z axis of the fitted plane, with the pixel coordinates being the X and Y axes of the fitted plane (e.g., the image can be considered a 2D function, f(x,y)=z, where x and y are the pixel coordinates, and z is the color of that pixel in a color channel). For example, the fitted plane can indicate fitted pixel values at corresponding pixel positions. The fitted plane can indicate an estimated linear relationship in the change of colors of pixels over successive or adjacent pixel positions in the image, e.g., an approximately linear change in colors of pixels positioned successively adjacent to each other in one or more directions in the image. In some implementations, a gradient is an example of such a linear change in colors in a "spatial" direction in an image. Some implementations can fit a curve or other graph to the pixels based on polynomial relationships of pixel color changes other than a linear relationship.

Fitting a plane to the weighted pixel values can be based on a linear assumption of the pixel values, e.g., an assumption of linear change in the pixel values, in contrast to a constant assumption of pixel values. The piecewise linear assumption described herein can estimate a fitted line or plane to color values, allowing linear changes in pixel values to be accommodated. The approach can avoid erroneously detecting such pixel value changes as noise. For example, a linear relationship (or other polynomial relationship) in color values can be present in a low-frequency linear gradient in color values formed by light variation on a surface, as in common in many images.

In operation 312, the method uses the fitted planes to determine residual values of the pixels that the fitted planes do not accurately or precisely describe. For example, a residual value can be determined for each feature pixel in the patch (and/or for one or more non-feature pixels in the patch, if using the weight of non-feature patch pixels), based on the color of the feature pixel and the approximated fitted plane color of the pixel. In one example, a residual value for a pixel is the difference between the fitted plane color value and the actual color value of that pixel, e.g., $r_c = f_c(p) - p_c$, where $r_c$ is the residual value in a particular channel, $f_c(p)$ is the fitted plane color value for that channel for a particular pixel, and $p_c$ is the actual color (in that channel) of the particular pixel. For example, a residual value can be determined for each of the red, green, and blue channels of the color of the pixel. The residual value can be an amount that pixel values of the feature pixels did not satisfy the estimated linear relationship of the pixel values, as indicated by the difference between the actual pixel color and the fitted plane color of a pixel.

In operation 314, the method removes correlation of a common directional component (if any) among the channels from corresponding residual values. For example, this correlation can be removed from each residual value in each color channel of each pixel. One purpose of this operation can be to remove actual image content from the residual values determined in operation 312. Image content is not desired in the residual values because it is not noise. For example, in some cameras or other devices, sensor noise may be present independently per color channel. Therefore, a color value component common across the channels can be considered image content that can be removed such that the remainder signal in each channel is a combination of noise and any signal that is unique to that channel. Since image changes unique to a single channel are uncommon, the result of the de-correlation can be a more accurate estimate of image noise.

In some examples, orthogonal vector projection can be applied to the feature pixels to de-correlate the color channels. For example, each residual value $r_c$ of a pixel can be an n-dimensional vector and the residual values of the color channels of a pixel may have a common directional component among them. The de-correlation in operation 314 removes the common directional component. In one example:

$$r'_c = r_c - \frac{r_c \cdot r_b}{r_b \cdot r_b} r_b \qquad (2)$$

$$r''_c = r'_c - \frac{r'_c \cdot r_a}{r_a \cdot r_a} r_a \qquad (3)$$

where $r_c$ is the residual value for a pixel for a channel c, $r_a$ and $r_b$ are the two residual values for the pixel in the two other color channels (assuming a three-channel color space such as RGB), and $r_c''$ is the de-correlated residual value for the channel c. The de-correlated residual value can be determined for each color channel of each pixel in the patch of pixels.

In some implementations, operation 314 can be omitted. For example, in some implementations, an image may be processed before it is received by the method 300. In some examples, a device or process (such as a camera or digital photograph processing software) may (e.g., aggressively) remove color noise from an image by converting the image to a color space such as YUV and applying large filters to the U and V (chroma) channels. This has the effect of making the color channels entirely correlated and moving the noise into the image luminance. If this is the case, then de-correlating the residual values in operation 314 may remove all noise from the residual values because the method may find that the color channels all change together. Therefore, in some implementations, for example, if the image has been previously modified to have no color noise, de-correlation of operation 314 can be omitted.

In operation 316, the method determines an aggregate error of the sample patch based on the residual values. This can be a single value representing an error estimate for the sample, e.g., for the entire patch of pixels including the sample point pixel. In some implementations, an error estimate can be determined for each color channel, where the error estimate represents the amount of image signal in that channel that did not satisfy the estimated linear relationship for the sample pixels in that channel. The aggregate error can then be determined based on the error estimate of each channel. For example, the aggregate error can be the average of the three error estimates of the three color channels. In some examples, the relations below can be used:

$$e_c = \left( \frac{\Sigma (w_j r_c)^2}{\Sigma w_j} \right)^{\frac{1}{2}} \qquad (4)$$

$$e = (e_r + e_g + e_b)/3 \qquad (5)$$

where $e_c$ is the estimated error for a channel c, $w_j$ is each weighted pixel value in the sample patch, $r_c$ is the residual value for the channel, and e is the aggregate error. Some implementations can use pixel values other than color for the noise estimation. For example, a single channel error estimate (residual value) may have resulted for each patch from prior operation 312, e.g., for a black and white/grayscale image, and so an aggregation of error estimates from multiple channels in operation 316 may not be needed.

In operation 318, the method checks whether there is another sample patch of pixels in the image for which to determine the aggregate error e. If so, the method returns to operation 306 to select another sample point pixel in the image and determine the aggregate error of the sample patch of pixels around that sample point pixel. If there are no further samples to process in the image, the method continues to operation 320.

At this point in the method, an error estimate $e_i$ for each sample patch of pixels in the image is available. The error estimate is the amount of the image signal that did not satisfy the piecewise linear assumption and is an estimate for image noise. In some implementations, the method can now determine an overall measure of image noise for the image by selecting one of the error estimates e based on operations such as operations 320-324. In some implementations, a minimum error estimate (e.g., approximately minimum error estimate) is selected out of the sample error estimates. In some implementations, the minimum error estimate is more likely to indicate a more accurate measure of the noise in the image. For example, larger error estimates may be a result of examining patches of pixels having more structure (e.g., edges), texture, or other features that may cause overestimation of noise. In addition, error estimates for some patches of pixels can be discarded based on other conditions, as described below.

In operation 320, the method discards or otherwise removes any sample patches of pixels (and their associated error estimates $e_i$) that meet error and luminance thresholds. In some implementations, the method can check each patch of pixels with respect to a predetermined error threshold to determine if the patch has an error $e_i$ that satisfies (e.g., is less than) the error threshold. In one example, the threshold can be 0.000001 (e.g., 1e-6). If the error is less than the error threshold, the sample patch can be designated to be in a pixel region that has constant color substantially without noise, and so the sample patch and its error estimate are discarded (e.g., removed) from consideration in the determination of an error estimate for the image. For example, in some implementations, constant regions can occur if the image has been manipulated before the method 300 receives the image for noise level estimation, e.g., if a user and/or program adds a border or frame to the image, adjusts the brightness, or erases a portion of the image.

The method can, in some implementations, check the sample patches with respect to a luminance range or luminance thresholds. For example, the method can determine the luminance $v_i$ of each sample patch $s_i$. In some examples, the luminance of a sample patch can be a geometric mean, average, or other combined resulting luminance based on the luminance values of the pixels in the sample patch. The method can check whether the luminance value of each sample patch is within predetermined ranges of the extreme values (e.g., maximum and minimum) of a luminance range used for the image. In some examples, a luminance value range of 0-255 can be used. If the luminance value is within a predetermined range above the minimum value (e.g., 0) then the sample patch is designated to be underexposed and is discarded (and its error estimate is discarded). Similarly, if the luminance is within a predetermined range below the maximum value (e.g., 255), then the sample patch is designated to be overexposed and is discarded (and its error estimate is discarded).

In operation 322, the method assigns the remaining patches of pixels to tonal regions and finds a noise level estimate for each tonal region. The tonal regions can be different predetermined ranges of luminance values in the entire luminance value range used for the image. For example, any number of tonal regions can be used to divide up the entire range of luminance values for the pixels. For example, in some implementations, three tonal regions can be used: shadows (low luminance values), midtones (middle luminance values), and highlights (high luminance values). Each sample patch $s_i$ is assigned to one of the tonal regions based on its determined luminance $v_i$ (determined for the patches as described above). The method can then select a minimum of the error estimates $e_i$ in each tonal region as the error estimate for that tonal region. In some implementations, the method can select an approximate minimum of the error estimates $e_i$, e.g., an error estimate $e_i$ in each tonal region that is small but is not the smallest or minimum error estimate of the patches in that tonal region, e.g., to discard outliers that are the smallest estimates. For example, for each tonal region, the method can find the first percentile of the sample errors $e_i$ in the tonal region, discarding other sample errors below and above the first percentile error estimates and averaging the first percentile error estimates to determine the overall noise estimate for the tonal region. Some implementations can use a different percentile, e.g., second or third percentile, etc.

In operation 324, the method selects the minimum of the tonal region noise estimates of the remaining patches as the overall noise level estimate for the image. In some implementations, the tonal region noise level estimates can first be weighted and then the minimum of the weighted tonal region noise estimates is selected. For example, since many images may have lower noise levels in the shadow and highlight luminance value ranges than in the midtone luminance value range, the shadow and highlight noise estimates can be weighted higher, e.g., based on the difference between shadow and midtone noise estimates and/or difference between highlight and midtone noise estimates. This weighting can compensate for differing noise levels in different tonal regions.

The overall noise level estimate indicates an estimated amount of noise in the image. In some implementations, a de-noiser or other noise-reduction process or module can receive the resulting noise estimation and use the estimation to determine and apply noise reduction processing to the image to remove noise.

In some implementations, a non-linear assumption and relationship can be used instead of a linear assumption and relationship, e.g., in operations 310 and 312 described above. For example, a different polynomial relationship than a linear relationship can be used. In some examples, a higher order function can be used instead of a line, such as a curve, quadratic function, or other function. In some examples, a sine or cosine function can be used as the basis of the estimated relationship of color distribution (or distribution of other pixel values). For example, lighting in an image may fall off as a function of the cosine of the angle between the vector of the light and the normal vector of the surface receiving the light. In some implementations, such a relationship may be useful for larger patches of pixels in which there may appear other than a linear distribution of colors or lighting.

It should be noted that the operations described in the methods 200 and 300 can be performed in a different order than shown and/or simultaneously (partially or completely)

with other operations, where appropriate. In some implementations, operations can occur multiple times, in a different order, and/or at different times in the methods. In some implementations, the methods 200 and 300 can be implemented, for example, on a server system 102 as shown in FIG. 1. In some implementations, one or more client devices can perform one or more operations instead of or in addition to a server system performing those operations.

Methods described herein can be implemented by program instructions or code, which can be executed on a computer, e.g., implemented by one or more processors, such as microprocessors or other processing circuitry and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. One or more methods can be performed as part of or component of an application running on the system, or as an application or software running in conjunction with other applications and operating system.

Figure 4:
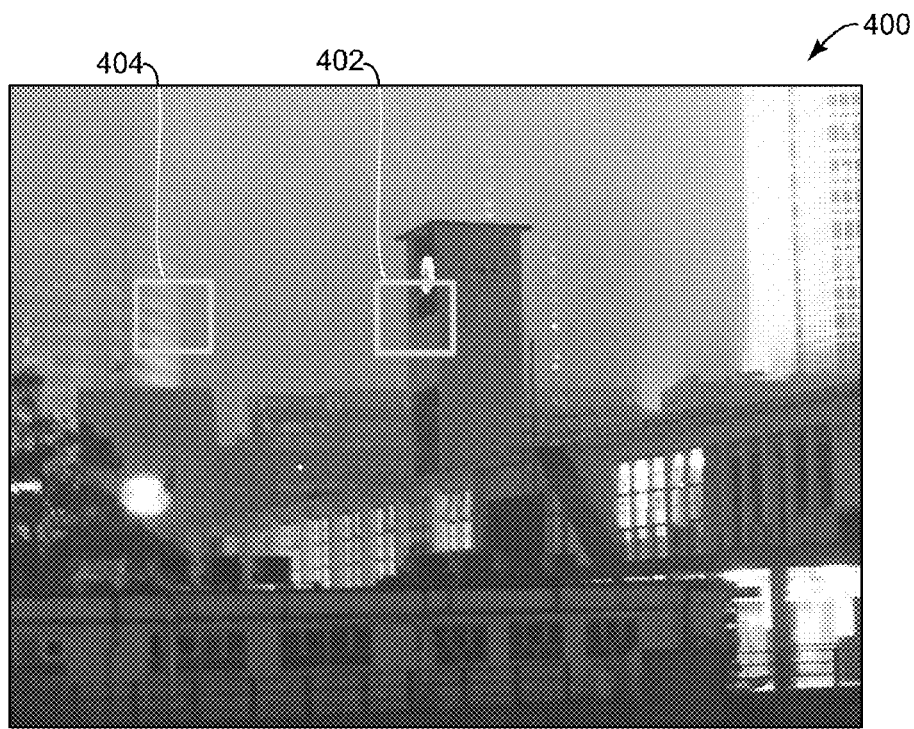
FIG. 4 is a diagrammatic illustration of an example image that can be processed using one or more features described herein to estimate noise in the image.

FIG. 4 is a diagrammatic illustration of an example image 400 that can be processed using one or more features described herein to estimate noise in an image. In various implementations, image 400 can be displayed on a display device, e.g., of a client device 120, 122, 124, and/or 126 of FIG. 1, or a server system 102 in some implementations. In other implementations, the image 400 can be processed as described herein without being displayed, or be displayed after all processing (e.g., including noise reduction) is complete. In some examples, a user can view image 400 displayed in an interface on a client device. Image 400 includes a degree of color noise as indicated by the change in color of pixels in particular areas (color noise is approximated in the figure which is shown in grayscale).

Methods described above can examine sample patches of pixels from the image 400. For example, pixels in a patch can be located around a sample point pixel of that patch. In this simplified example, a sample patch is taken from area 402 and a sample patch is taken from area 404 of the image 400. Other sample patches of image 400 are also determined and examined (these are not shown).

Figures 5, 6:
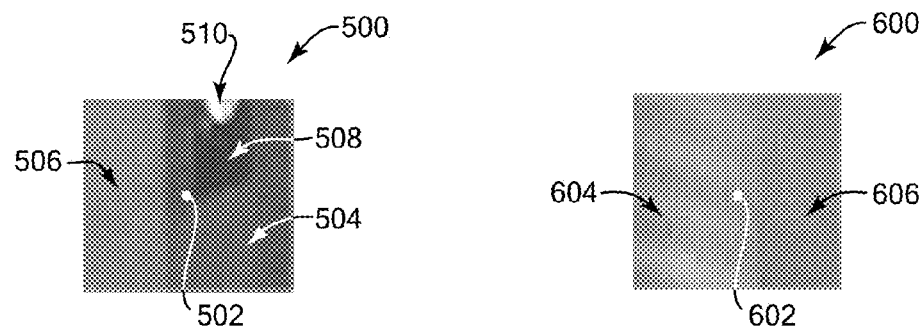
FIGS. 5-6 are diagrammatic illustrations of examples of sample patches of pixels extracted from the image of FIG. 4 and analyzed.

FIGS. 5 and 6 are diagrammatic illustrations of examples of sample patches of pixels which can be extracted from an image such as image 400 of FIG. 4. Sample patch 500 of FIG. 5 corresponds to area 402 of FIG. 4, for example, and shows color noise in the pixel color differences (approximated in gray shades in the FIGS. 4, 5 and 6). A pixel at point 502 can be used as the sample point pixel (reference pixel) for the patch 500. A pixel region 504 is an image feature that includes the sample point pixel 502 and is part of a depicted building, while pixel regions 506, 508, and 510 are part of other depicted image features of the image 400, such as the sky (506), an indentation of the building (508), and a clock (510), respectively.

The noise estimation method can use bilateral weights or other technique as described above with reference to operation 308 of FIG. 3 to determine that the pixel regions 504-510 are included in different image features of the image and therefore should not all be examined to determine noise, despite being in the same patch 500 of pixels. For example, the method can determine that pixel region 504 is similar in color to the sample point pixel 502 and is close enough in pixel distance to the sample point pixel 502 to be part of the same image feature, so that the pixels of region 504 will be examined for noise. The method can also determine that pixel regions 506, 508, and 510 are not similar in color to the sample point pixel 502, and/or may be separate based on detected color edges found in the image, and so exclude the pixels of these regions from noise estimation analysis. This allows noise to be estimated more accurately since pixels of widely varying colors that are part of different image features are not both being examined for noise as part of the same patch of pixels. In some implementations, the regions 506, 508, and 510 can each be independently examined by the method for additional and independent noise estimations.

Sample patch 600 of FIG. 6 corresponds to area 404 of FIG. 4, for example, and shows color noise. A pixel at point 602 can be used as the sample point pixel (reference pixel) for the patch 600. The method can determine two pixel regions 604 and 606, where the region 604 is found to include pixels similar to the sample point pixel 602 and region 606 is found to include pixels differing enough in color to be excluded in the examination for noise (and can be examined separately and independently for noise in some implementations). In this example, the noise estimation method uses a piecewise linear assumption of a linear relationship of color values in a selected feature. The color gradients within reference pixel region 604 (or region 606) may fit the linear approximation so that noise is accurately detected, unlike a constant assumption which may erroneously find additional noise in region 604 (or 606) that is not actually present.

Figure 7:
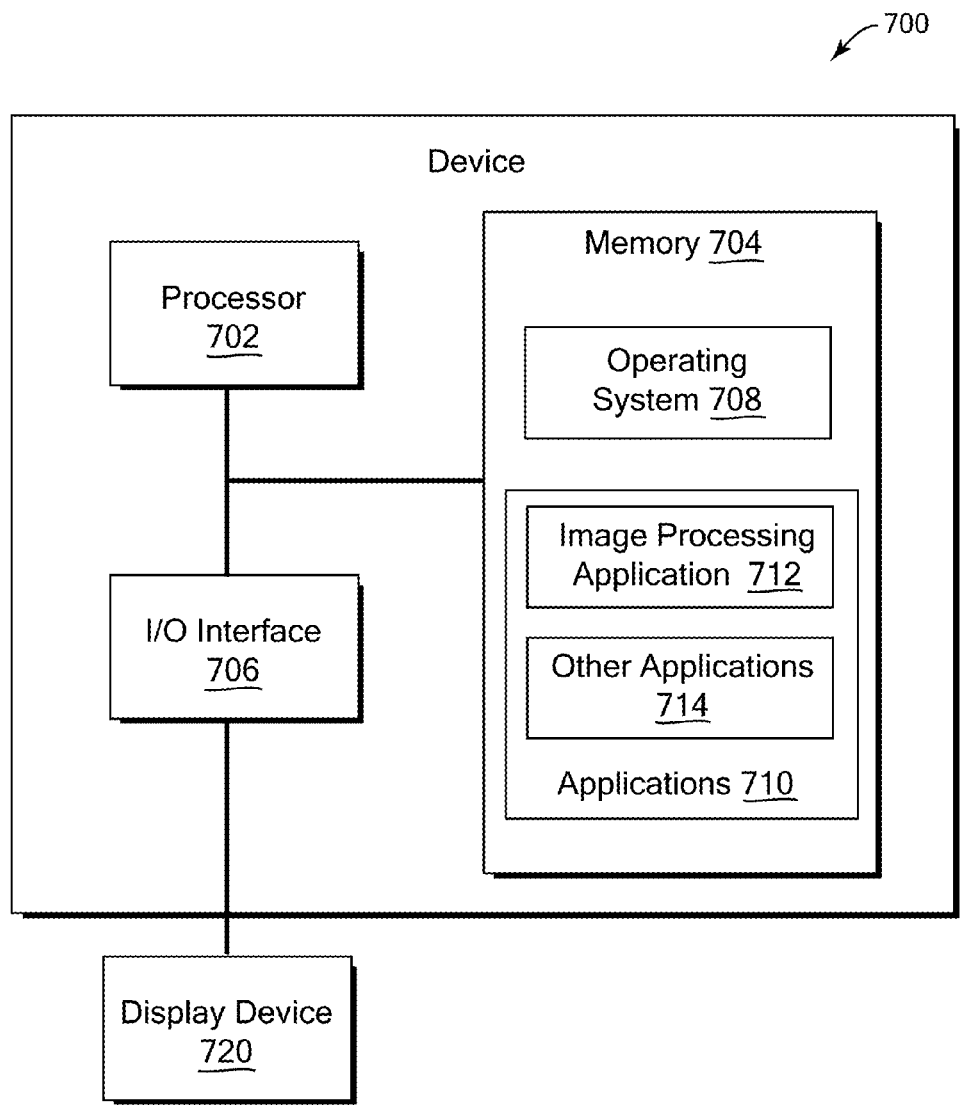
FIG. 7 is a block diagram of an example device which may be used for one or more implementations described herein.

FIG. 7 is a block diagram of an example device 700 which may be used to implement some implementations described herein. In some implementations, device 700 may be used to implement a server device, e.g., server system 102 or server device 104 of FIG. 1, and perform appropriate method implementations described herein. Server device 700 can be any suitable computer system, server, or other electronic or hardware device. For example, the server device 700 can be a mainframe computer, desktop computer, workstation, portable computer, or electronic device (portable device, cell phone, smart phone, tablet computer, wearable device, television, TV set top box, personal digital assistant (PDA), media player, game device, etc.). In some implementations, server device 700 includes a processor 702, a memory 704, and input/output (I/O) interface 706.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Processor 702 can be one or more processors or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708 and one or more applications 710 such as a graphics editing engine, web hosting engine, social networking engine, etc. In some implementations, the applications 710 can include instructions that enable processor 702 to perform the functions described herein, e.g., some or all of the methods of FIGS. 2 and 3. For example, applications 710 can include one or more image processing applications 712, including an application to estimate noise in an obtained image as described herein, and which can also include functions to display images and/or edit images. An image processing application, for example, can provide a displayed user interface responsive to user input to process and/or display images with options selected by the user in the user interface. Other applications or engines 714 can also or alternatively be included in applications 710, e.g., communication applications, web hosting engine or application, social networking engine or application, etc. Any of software in memory 704 can alternatively be stored on any other suitable storage location or computer-readable medium. In addition, memory 704 (and/or other connected storage device(s)) can store images, sample patches of pixels, thresholds, data structures, user preferences and selected options, and other instructions and data used in the features described herein. Memory 704 and any other type of storage (magnetic disk, optical disk, magnetic tape, or other tangible media) can be considered "storage devices."

I/O interface 706 can provide functions to enable interfacing the server device 700 with other systems and devices. For example, network communication devices, storage devices such as memory and/or database 106, and input/output devices can communicate via interface 706. In some implementations, the I/O interface can connect to interface devices such as input devices (keyboard, pointing device, touchscreen, microphone, camera, scanner, etc.) and output devices (display device, speaker devices, printer, motor, etc.). A display device 720 is one example of an output device that can be used to display images, e.g., images having noise estimated as described herein.

For ease of illustration, FIG. 7 shows one block for each of processor 702, memory 704, I/O interface 706, and software blocks 708 and 710. These blocks may represent one or more processors or processing circuitries, operating systems, memories, I/O interfaces, applications, and/or software modules. In other implementations, server device 700 may not have all of the components shown and/or may have other elements including other types of elements instead of, or in addition to, those shown herein. While system 102 is described as performing operations as described in some implementations herein, any suitable component or combination of components of system 102 or similar system, or any suitable processor or processors associated with such a system, may perform the operations described.

A client device can also implement and/or be used with features described herein, such as any of client devices 120-126 shown in FIG. 1. Example client devices can include some similar components as the device 700, such as processor(s) 702, memory 704, and I/O interface 706. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device 720, for example, can be used to display the images per- and post-processing as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to estimate noise in an image, the method comprising:
   determining a plurality of patches of pixels in the image;
   determining, for each patch of pixels, feature pixels in the patch that are included in a particular image feature at least partially depicted in the patch;
   determining, for each patch of pixels, an error estimate, wherein the error estimate is based on an amount by which pixel values of the feature pixels in the patch of pixels are different from an estimated polynomial relationship between the feature pixels in the patch of pixels; and
   selecting one of the error estimates as a noise level estimate for the image.

2. The method of claim 1 wherein the pixel values of the feature pixels are color values of the feature pixels.

3. The method of claim 1 wherein the estimated polynomial relationship in the pixel values is an estimated linear relationship in a change of the pixel values across adjacent pixels in the patch.

4. The method of claim 1 wherein determining feature pixels in the patch includes determining the feature pixels with reference to a reference pixel in the patch, wherein the reference pixel is included in the particular image feature.

5. The method of claim 1 wherein determining the plurality of patches includes dividing the image into rectangular patches in a grid pattern, and wherein the particular image feature includes an object or a region depicted in the image.

6. The method of claim 1 wherein determining the feature pixels in the patch includes:
   assigning weights providing a greater contribution to the error estimate of the patch to pixels in the patch that are included in the particular image feature, and
   assigning weights providing a lesser contribution to the error estimate of the patch to pixels in the patch that that are not included in the particular image feature,
   wherein each error estimate is an estimate of an amount by which the weighted pixel values of the pixels in the patch of pixels are different from the estimated polynomial relationship.

7. The method of claim 1 wherein determining the feature pixels in the patch includes applying an edge-respecting filter to identify the feature pixels as pixels within boundaries of the particular image feature depicted in the patch.

8. The method of claim 1 wherein determining the feature pixels in the patch includes:
   determining, for each pixel in the patch, a similarity between the pixel and a reference pixel in the patch based on a comparison of the pixel to the reference pixel, wherein the feature pixels in the patch have greater similarity to the reference pixel than pixels in the patch that are not feature pixels.

9. The method of claim 8 wherein the similarity between the pixel and the reference pixel includes a color similarity.

10. The method of claim 8 wherein the similarity between the pixel and the reference pixel is based on a distance between the pixel and the reference pixel, wherein a greater distance between the pixel and the reference pixel indicates a lower similarity.

11. The method of claim 1 wherein determining the error estimate for each patch of pixels includes:
    fitting an estimated plane to a plurality of the feature pixels based on pixel positions of the plurality of feature pixels in the patch, the estimated plane indicating fitted pixel values at corresponding pixel positions; and
    determining differences in pixel values of one or more pixels of the patch and the fitted pixel values on the estimated plane at pixel positions corresponding to the one or more pixels.

12. The method of claim 11 wherein each pixel has a color value in each of multiple color channels, wherein fitting the estimated plane to a plurality of the feature pixels includes fitting an estimated color channel plane to each color channel of the plurality of the feature pixels.

13. The method of claim 12 wherein determining an error estimate includes applying orthogonal vector projection to each patch to de-correlate a common directional component in the color channels of the differences in pixel values of the patch.

14. The method of claim 1 wherein selecting one of the error estimates includes:
    determining, for each patch, a luminance of the patch; and
    prior to selecting one of the error estimates, discarding one or more error estimates corresponding to one or more patches of pixels having a determined luminance within a predetermined range.

15. The method of claim 1 wherein selecting one of the error estimates includes:
    assigning each patch of pixels to one of a plurality of tonal regions based on the luminance of the patch of pixels;
    for each of the plurality of tonal regions, identifying a tonal region noise estimate as an approximately minimum error estimate from the error estimates of the patches of pixels assigned to the tonal region; and
    selecting a minimum of the tonal region noise estimates as the noise estimation for the image.

16. The method of claim 15 wherein the pixel values in one or more of the tonal regions are weighted based on the luminance values in the tonal region, and wherein the tonal regions include at least one of: a shadow region, a mid-tone region, and a highlight region.

17. The method of claim 1 wherein selecting one of the error estimates includes:
    determining that one or more of the error estimates satisfies an error threshold; and
    prior to selecting one of the error estimates, discarding the one or more error estimates satisfying the error threshold.

18. A system to estimate noise in an image, the system comprising:
    a storage device; and
    at least one processor operative to access the storage device and operative to perform operations comprising:
    determining a plurality of patches of pixels in the image;
    for each patch of pixels, weighting a pixel value of each pixel in the patch based on a similarity of the pixel to a reference pixel in the patch;
    determining an error estimate for each patch of pixels, wherein each error estimate is an estimate of an amount by which the weighted pixel values of the pixels in the patch of pixels are different from an estimated polynomial relationship between the weighted pixels in the patch of pixels; and
    selecting one of the error estimates as a noise level estimate for the image.

19. The system of claim 18 wherein the pixel values of the patch are color values of the feature pixels and the polynomial relationship is a linear relationship of the weighted pixel values, and
    wherein weighting a pixel value of each pixel in the patch includes weighting the pixel value based on a similarity of the pixel value to the reference pixel in the patch, wherein weights providing greater contribution to the error estimates are assigned to pixels in the patch that are more similar to the reference pixel.

20. A non-transitory computer readable medium having stored thereon software instructions that, when executed by a processor, cause the processor to estimate noise in an image by performing operations including:

determining a plurality of patches of pixels in the image;

for each patch of pixels, determining feature pixels in the patch that are included in a particular image feature at least partially depicted in the patch;

determining an error estimate for each patch of pixels, wherein each error estimate is based on an amount by which color values of the feature pixels in the patch of pixels are different from an estimated linear relationship between the feature pixels in the patch of pixels; and selecting one of the error estimates as a noise level estimate for the image.

* * * * *